United States Patent
Parkinson

(10) Patent No.: US 8,533,463 B2
(45) Date of Patent: Sep. 10, 2013

(54) REDUCED COMPUTATION FOR GENERATION OF CERTIFICATE REVOCATION INFORMATION

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 1319 days.

(21) Appl. No.: 11/897,759

(22) Filed: Aug. 30, 2007

(65) Prior Publication Data

US 2009/0063855 A1    Mar. 5, 2009

(51) Int. Cl.
*H04L 29/06* (2006.01)
*H04L 9/32* (2006.01)

(52) U.S. Cl.
USPC ............ 713/158; 713/155; 713/156; 713/157

(58) Field of Classification Search
None
See application file for complete search history.

(56) References Cited

U.S. PATENT DOCUMENTS

| | | | |
|---|---|---|---|
| 5,699,431 A | 12/1997 | Van Oorschot et al. | |
| 6,108,644 A * | 8/2000 | Goldschlag et al. | 705/69 |
| 6,397,329 B1 | 5/2002 | Aiello et al. | |
| 6,487,658 B1 * | 11/2002 | Micali | 713/158 |
| 6,748,447 B1 | 6/2004 | Basani et al. | |
| 6,970,862 B2 * | 11/2005 | Kwan | 1/1 |
| 7,337,315 B2 | 2/2008 | Micali | |
| 7,500,100 B1 * | 3/2009 | Kobozev et al. | 713/168 |
| 7,526,644 B2 | 4/2009 | Kocher | |
| 7,761,703 B2 * | 7/2010 | Little et al. | 713/156 |
| 2002/0104000 A1 | 8/2002 | Kang et al. | |
| 2002/0156748 A1 * | 10/2002 | Wendenburg et al. | 705/80 |
| 2003/0028805 A1 * | 2/2003 | Lahteenmaki | 713/201 |
| 2003/0079125 A1 * | 4/2003 | Hope et al. | 713/156 |
| 2003/0220946 A1 | 11/2003 | Malik | |
| 2004/0111607 A1 | 6/2004 | Yellepeddy | |
| 2005/0148323 A1 * | 7/2005 | Little et al. | 455/414.1 |
| 2005/0154879 A1 * | 7/2005 | Engberg et al. | 713/157 |
| 2005/0172128 A1 * | 8/2005 | Little et al. | 713/168 |
| 2005/0191990 A1 * | 9/2005 | Willey et al. | 455/411 |
| 2005/0193204 A1 * | 9/2005 | Engberg et al. | 713/175 |
| 2006/0005263 A1 * | 1/2006 | Hardt | 726/28 |
| 2006/0143136 A1 | 6/2006 | Low et al. | |
| 2006/0179008 A1 * | 8/2006 | Tallent et al. | 705/75 |
| 2006/0288224 A1 | 12/2006 | Won et al. | |
| 2007/0260589 A1 | 11/2007 | Yugami | |
| 2007/0260877 A1 * | 11/2007 | Adams et al. | 713/156 |
| 2007/0294526 A1 | 12/2007 | Medvinsky et al. | |
| 2008/0003980 A1 * | 1/2008 | Voss et al. | 455/411 |
| 2008/0025492 A1 * | 1/2008 | Heinze et al. | 379/220.01 |

OTHER PUBLICATIONS

Internet Engineering Task Force ("IETF") Request for Comments ("RFC") document No. 2560, published Jun. 1999.

\* cited by examiner

*Primary Examiner* — Nathan Flynn
*Assistant Examiner* — Trang Doan
(74) *Attorney, Agent, or Firm* — Lowenstein Sandler LLP

(57) ABSTRACT

A method and apparatus for propagating certificate revocation information. A first query is received regarding a revocation status of a first digital certificate. One or more additional queries are received regarding revocation statuses of one or more additional digital certificates. A response to the first query and the one or more additional queries is generated, the response including the revocation status of the first digital certificate and the revocation statuses of the one or more additional digital certificates.

19 Claims, 7 Drawing Sheets

US 8,533,463 B2

REDUCED COMPUTATION FOR GENERATION OF CERTIFICATE REVOCATION INFORMATION

TECHNICAL FIELD

Embodiments of the present invention relate to propagation of certificate revocation information, and more specifically to responding to revocation status queries.

BACKGROUND

In cryptographic systems such as a public key infrastructure (PKI), certificates can be used to encrypt messages such that only a holder of a private key associated with a specific certificate can read the message, and to digitally sign information to prove that the private key holder is the source of the information. Digital signatures provide an effective, universally verifiable form of authentication. As in any system, a PKI is subject to security breaches.

Digital certificates facilitate the use of digital signatures by providing a guarantee that a particular public key belongs to a specific identity and, therefore, ensuring that the public key can be used to verify the signature. Digital certificates include a unique certificate serial number, a public key, and a user's name, bound together by a certificate authority's (CA's) digital signature. Many types of digital certificates are used, such as email certificates, encryption certificates, signing certificates, and so on.

A digital certificate is associated with a unique public key pair having a unique private key and a unique public key. When a third party obtains a copy of the unique private key, the certificate associated with it becomes compromised. To mitigate the security breach that occurs when a certificate is compromised, CAs publish certificate revocation lists (CRLs) that indicate which certificates can still be trusted.

There are three conventional methods by which certificate revocation information is propagated to clients. In a first conventional method, clients download CRLs directly from certificate authorities. In a second conventional method, an online certificate status protocol (OCSP) is used to distribute certificate revocation information to clients.

FIG. 1 illustrates a conventional PKI architecture 100 for propagating certificate revocation information to clients according to the second conventional method. A certificate authority (CA) 103 generates a CRL 115 and transmits it 150 to an OCSP responder 105. The OCSP responder 105 is a secure server that has authority granted to it by the CA 103 to generate OCSP responses 124.

A relying party device 110 receives a message transmittal 164 from a mail server 113, the contents of which include a signed message 130. A certificate revocation determiner 126 residing on the relying party device 110 accesses the signed message 130 to check whether a certificate that was used to generate a cryptographic signature for the signed message 130 has been revoked. This is accomplished by sending an OCSP response query 172 to the OCSP responder 105.

Upon receiving the OCSP response query 172 for a particular certificate from the relying party device 110, the OCSP responder 105 generates an OCSP response 124 with an OCSP response generator 118 according to the CRL 115. The OCSP response 124 indicates whether the certificate for which the OCSP response 124 was requested has been revoked. Each OCSP response 124 relates to only a single certificate, and must be digitally signed 154 with a private key 120 associated with the OCSP responder 105 to verify the validity of the OCSP response 124. Once OCSP response 124 is generated 153 and signed 154, it is transmitted to the relying party device 110 that requested it.

A third conventional method for propagating certificate revocation information to clients is illustrated in FIG. 2. In the third conventional method, a CA 203 transmits a CRL 215 to an OCSP responder 205. The OCSP responder 205 generates OCSP responses 253 with an OCSP response generator 217, and digitally signs them 254 with a private key 222. The OCSP responses 224 are generated and signed once a day before client queries are made, and are referred to as pre-signed (or pre-generated) OCSP responses. Each pre-signed OCSP response includes revocation status information for twenty sequentially numbered certificates. Pre-signed OCSP responses 224 are transmitted 262 to third party a server 213.

A relying party device 210 receives a message transmittal 264 from a mail server 213, the contents of which include a signed message 230. A certificate revocation determiner 226 accesses 267 the signed message 230 to check whether a certificate that was used to generate a cryptographic signature on the signed message 230 has been revoked. This is accomplished by sending an OCSP response query 272 to third party server 213 regarding the certificate in question. Third party server 213 transmits 275 a pre-signed OCSP 224 response that includes an entry for the certificate inquired about.

Response queries for OCSP and other certificate validation protocols may include a nonce (a random string of values used to ensure that old communications cannot be reused). For a response transmittal to be accepted, the nonce must be included in the response. The use of a nonce in the response query forces a fresh response to be generated. Therefore, if a nonce is used, pre-signed responses (as described in method three and FIG. 2) cannot be used by conventional systems to respond to the query. Moreover, in conventional systems only a single nonce may be included in a response.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
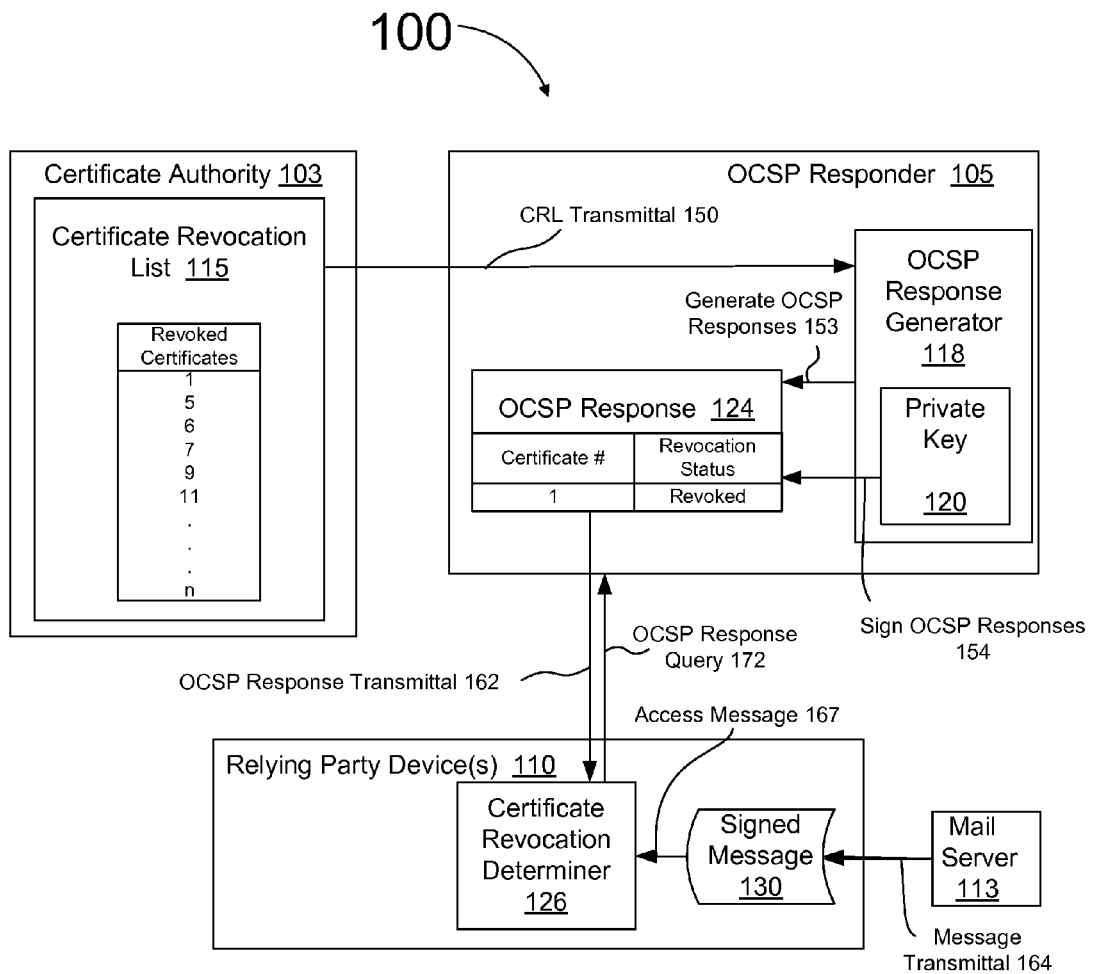
FIG. 1 illustrates a block diagram of one conventional PKI architecture.
Figure 2:
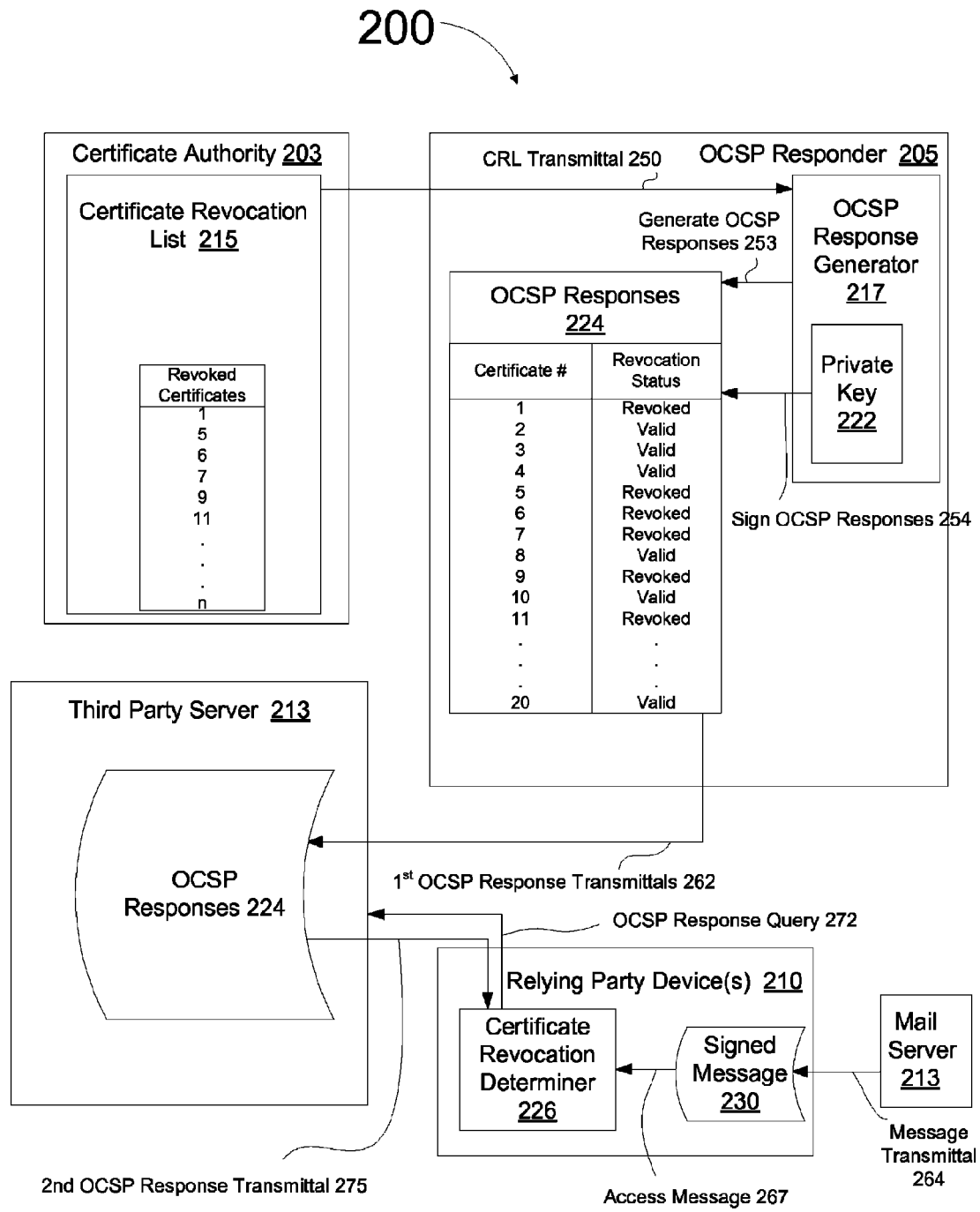
FIG. 2 illustrates a block diagram of another conventional PKI architecture.

Described herein is a method and apparatus for propagating certificate revocation information. In one embodiment, a first query is received regarding a revocation status of a first digital certificate. Additional queries regarding the revocation statuses of other digital certificates may also be received. A single response may be generated that responds to the first query and to the additional queries (if additional queries were received). The response may include the revocation status of the first digital certificate and the revocation statuses of the other digital certificates. In one embodiment, some queries may include a nonce. Any nonces included in the queries may be included in the response.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Herein below, embodiments of the invention are discussed that optimize distribution of certificate revocation information using Online Certificate Status Protocol ("OCSP," described in Internet Engineering Task Force ("IETF") Request for Comments ("RFC") document number 2560, published June 1999). Specific embodiments discuss OCSP responses, OCSP responders, and relying parties (OCSP clients). However, embodiments of the present invention may use other protocols for the distribution of certificate information as well. In such alternative protocols, certification statements other than OCSP responses may be used, servers may be other than OCSP responders, and clients are not limited to OCSP clients. Examples of alternative protocols that may be used by embodiments of the present invention include, but are not limited to, certificate management protocol (CMP), XML key management specification (XKMS), and simple certificate validation protocol (SCVP).

Figure 3:
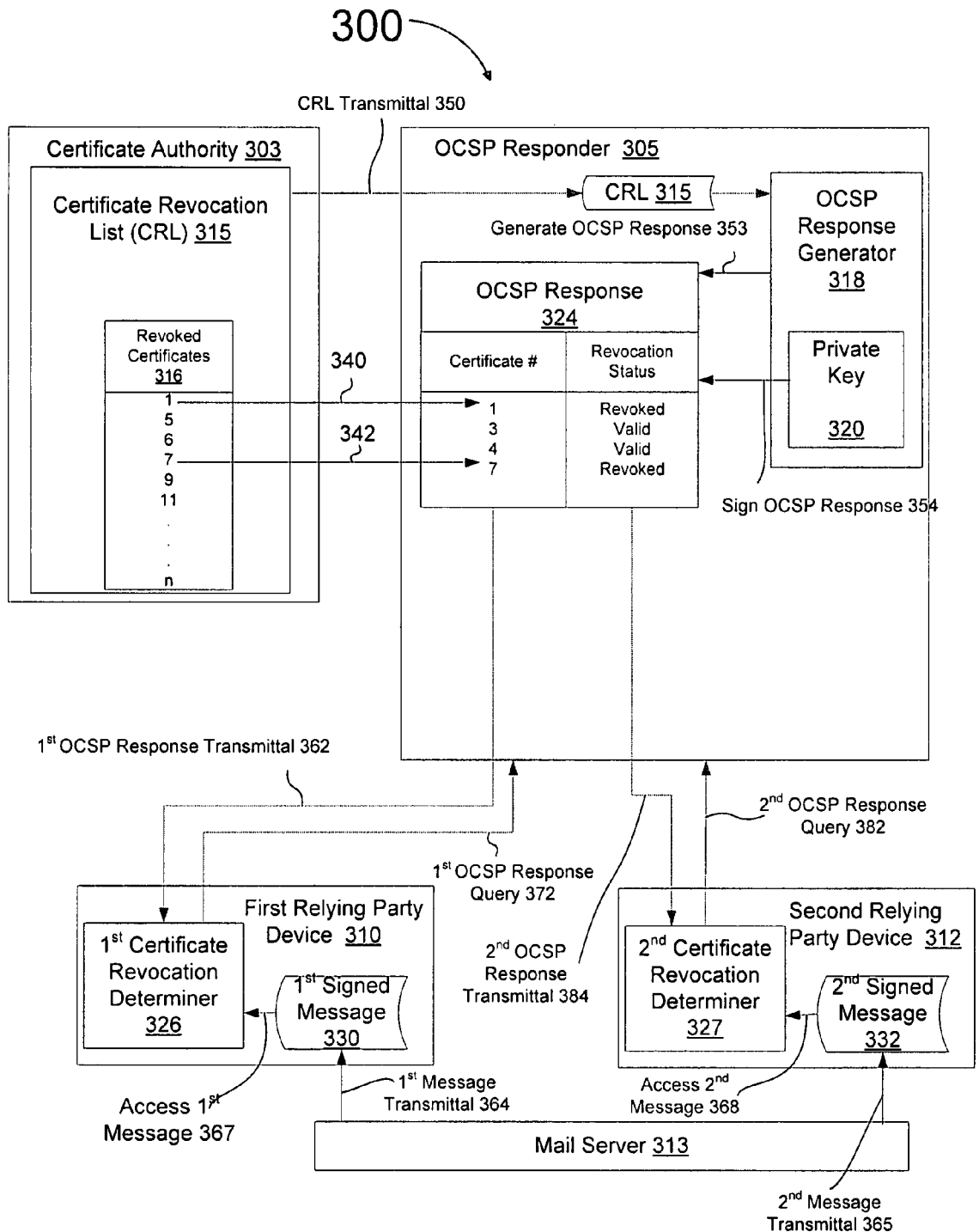
FIG. 3 illustrates a diagrammatic representation of one embodiment of an exemplary PKI architecture.

FIG. 3 illustrates an exemplary PKI architecture 300 in which embodiments of the present invention can be implemented. The PKI architecture 300 may include a certificate authority (CA) 303, an OCSP responder 305, one or more relying parties 310, 312 and a mail server 313, connected through a private or public network, examples of which include the Internet, an intranet, a local area network, etc. In an alternative PKI architecture, the OCSP responder may be replaced by a SCVP responder or other certificate validation responder (e.g., using CMP or XKMS). The relying party devices 310, 312 would then be SCVP clients, CMP clients, or XKMS clients, as appropriate.

The certificate authority (CA) 303 is a trusted server that generates digital certificates for individuals, the digital certificates verifying the identity of the individuals holding the certificates. The certificate authority 303 periodically generates a certificate revocation list (CRL) 315 that includes all revoked certificates 316 in a specified range of certificates. An exemplary CRL 315 is shown that includes certificate revocation statuses for certificates 1 through n. Only certificates that have been revoked are included in the CRL 315. The validity of a certificate can thus be inferred by an absence from the CRL 315. The CRL 315 can be generated daily, or on a different periodic basis, such as twice a day, hourly, every half hour, etc. The CRL 315 can include information on when the next update will be provided. The release of a new update renders older versions of a CRL 315 obsolete. Increased frequency of CRL generation can reduce the amount of time that revoked certificates remain usable at the cost of additional bandwidth and processing requirements. Each time a new CRL 315 is generated by the CA 303, it may be transmitted 350 to the OCSP responder 305 and stored.

Relying party devices 310, 312 may be OCSP clients that need to rely on a certificate, such as recipients of signed messages or web servers accepting secure sockets layer (SSL) client messages. First relying party device 310 may receive a first signed mail message 330 from the mail server 313. In order to verify the digital signature, the revocation status may be checked, such as by inquiry to OCSP responder 305. Other signed data may also be received from mail server 313 or from other sources (e.g., third party servers). First certificate revocation determiner 326 may access the message 367 (or other signed data) to determine what certificate was used to sign it (e.g., certificate #1). First certificate revocation determiner 326 may then make a first OCSP response query 372 to the OCSP responder 305 for the determined certificate (e.g., certificate #1) to find out a revocation status of the certificate.

Second relying party device 312 may receive a second signed mail message 332 from the mail server 313. Other signed data may also be received from mail server 313 or from other sources (e.g., third party servers). Second certificate revocation determiner 327 may access the message 368 (or other signed data) to determine what certificate was used to sign it (e.g., certificate #4). Second certificate revocation determiner 327 may then make a second OCSP response query 382 to the OCSP responder 305 for the determined certificate (e.g., certificate #4).

The OCSP responder 305 may be a server that has been granted authority by the CA 303 to distribute certificate revocation information to relying parties 310, 312. Alternatively, the OCSP responder 305 may be a server that relying party devices 310, 312 trust to accurately report on certificate revocation information, even though the server has not been granted authority by the CA 303.

OCSP responder 305 may receive OCSP response queries (e.g., first OCSP response query 372 and second OCSP response query 382) from relying party devices 310, 312. OCSP response generator 318 may determine the revocation statuses of certificates indicated by the OCSP response queries by checking CRL 315. Based on this determination, an OCSP response 324 may be generated. An OCSP response 324 includes revocation status information for each certificate that has an entry therein, and may include response type, time at which response was computed, an expiry time for the OCSP response 324, a digital signature algorithm identifier of the OCSP responder 305, certificate number(s), whether certificate(s) are valid or revoked, a digital signature of the OCSP responder 305, etc.

OCSP response generator 318 may group together multiple OCSP response queries, and generate a single OCSP response 324 that includes certificates associated with each of the OCSP response queries in the group. By grouping together OCSP response queries and generating OCSP responses for the group, fewer OCSP responses may need to be generated, which may reduce the number of CPU-intensive signing operations, which in turn may free up considerable processor usage. For example, if eight OCSP response queries are included in a group, the number of OCSP responses that need to be generated may be reduced by a factor of eight, which may significantly improve performance (e.g., increase response time, reduce lag, reduce processor usage, etc.) of the OCSP responder 405.

In one embodiment, OCSP response generator 318 groups together OCSP response queries received within a predetermined time period. For example, once a first OCSP response query is received, subsequent OCSP response queries received within half a second, one second, five seconds, one minute, etc. of the first OCSP response query may be grouped together. In another embodiment, OCSP response generator 318 waits until a predetermined number of OCSP response queries are received. OCSP response generator 318 may then group the received predetermined number of OCSP responses into a group. In yet another embodiment, OCSP response generator 318 may generate a group when either the predetermined time limit expires or the predetermined number of response queries is received (e.g., whichever occurs first). Alternatively, other criteria may be used to determine how OCSP response queries are grouped together, the number of OCSP response queries to group together, and/or when the OCSP response queries are grouped together. For example, how OCSP response queries are grouped may be determined based on the certificates associated with the response queries (e.g., a maximum number of certificates per OCSP response may apply).

Once OCSP response 324 is generated, it is digitally signed 354 with a private key 320. The private key 320 is part of a public key pair that is associated with the OCSP responder 305. The digital signature verifies the OCSP responder 305 as the OCSP response source, and ensures that the contents of the OCSP response 324 are accurate and can be trusted. As mentioned above, grouping together OCSP response queries may reduce the number of OCSP responses generated. Digitally signing an OCSP response 324 may require considerable processor time. Therefore, by digitally signing a single OCSP response that includes multiple certificates associated with multiple OCSP response queries, a considerable performance gain may be realized.

In an example of one embodiment, the OCSP responder 305 may receive the first OCSP response query 372 requesting a revocation status of, for example, certificate #1. OCSP response generator 318 may then wait a predetermined time period (e.g., half a second, one second, five seconds, one minute, etc.) before generating an OCSP response 324 for the first OCSP response query. OCSP response generator 318 may also wait for a predetermined number of response queries before generating the OCSP response 324. The second OCSP response query 382, requesting revocation information on a certificate (e.g., certificate #4), may be received within the predetermined time period and/or within the predetermined number of response queries, and may be grouped together with the first OCSP response query 372. Moreover, other OCSP response queries for revocation statuses of other certificates (e.g., certificate #3 and certificate #7) may also be received within the predetermined time period and/or predetermined number of response queries, and thus also be included in the group.

OCSP response 324 may then be generated 353 by OCSP response generator 318. Exemplary OCSP response 324 includes the revocation statuses for certificates #1, #3, #4 and #7. Entries for certificates #1 and #7 from the certificate revocation list 315 are inserted 340 and 342, respectively, indicating that those certificates have been revoked. Certificates #3 and #4 are not included in the CRL, indicating that these certificates are still valid.

OCSP responder 305 may reply to the first OCSP response query 372 with a first OCSP response transmittal 362, and to the second OCSP response query 382 with a second OCSP response transmittal 384. Both the first OCSP response transmittal 362 and second OCSP response transmittal 384 may include OCSP response 324. First relying party device 310 may examine the OCSP response 324 to determine that certificate #1 has been revoked, and may ignore the other certificates included in the OCSP response 324. Similarly, second relying party device 312 may examine the OCSP response 324 to determine that certificate #4 is valid, and may ignore the other certificates included in the OCSP response 324.

In the above described example certificate #1 has been revoked, therefore the contents of the first signed message 330 should not be trusted. The contents of the first message 330 are of doubtful credibility, and the message sender should be informed. Certificate #4 has not been revoked, therefore the contents of the second signed message 332 can be trusted.

Figure 4:
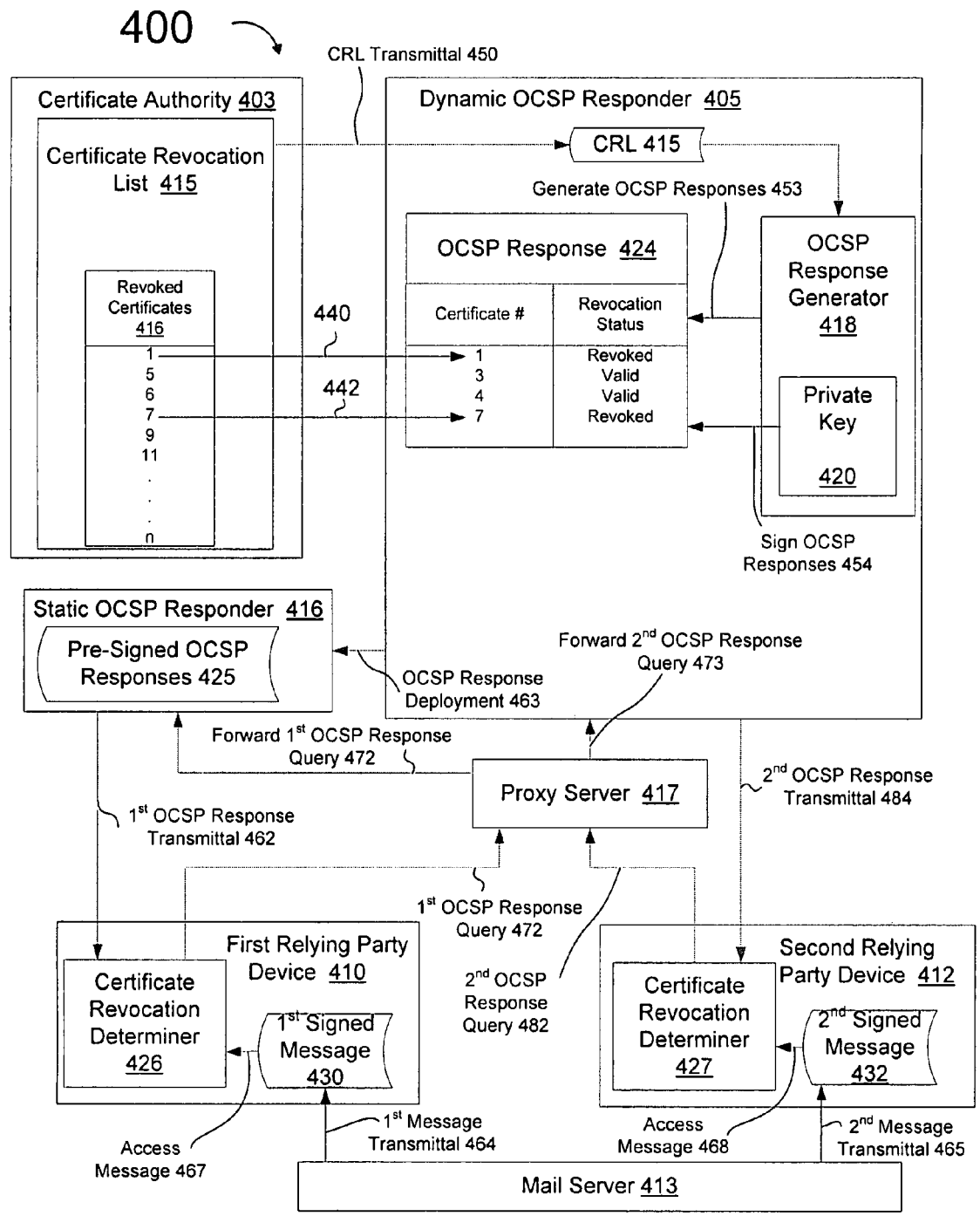
FIG. 4 illustrates a diagrammatic representation of another embodiment of an exemplary PKI architecture.

FIG. 4 illustrates another exemplary PKI architecture 400 in which embodiments of the present invention can be implemented. The PKI architecture 400 may include a certificate authority (CA) 403, a dynamic OCSP responder 405, one or more relying parties 410, 412, a static OCSP responder 416, a proxy server 417 and a mail server 413, connected through a private or public network, examples of which include the Internet, an intranet, a local area network, etc. In an alternative PKI architecture, the dynamic OCSP responder 405 and static OCSP responder 416 may be replaced by SCVP responders or other certificate validation responders (e.g., using CMP or XKMS). The relying party devices 410, 412 would then be SCVP clients, CMP clients, or XKMS clients, as appropriate.

The certificate authority (CA) 403 is a trusted server that generates digital certificates for individuals, the digital certificates verifying the identity of the individuals holding the certificates. The certificate authority 403 periodically generates a certificate revocation list (CRL) 415 that includes all revoked certificates 316 in a specified range of certificates. An exemplary CRL 315 is shown that includes certificate revocation status for certificates 1 through n. Each time a new CRL 415 is generated by the CA 403, it may be transmitted 450 to the dynamic OCSP responder 405 and stored.

Relying party devices 410, 412 may be OCSP clients that need to rely on a certificate, such as recipients of signed messages or web servers accepting secure sockets layer (SSL) client messages. First relying party device 410 may receive a first signed mail message 430 from the mail server 413. Other signed data may also be received from mail server 413 or from other sources (e.g., third party servers). First certificate revocation determiner 426 may access the message 467 (or other signed data) to determine what certificate was used to sign it (e.g., certificate #1). First certificate revocation determiner 426 may then make a first OCSP response query 472 to the dynamic OCSP responder 405 or to the static OCSP responder 416 for the determined certificate (e.g., certificate #1) to find out a revocation status of the certificate.

Second relying party device 412 may receive a second signed mail message 432 from the mail server 413. Other signed data may also be received from mail server 413 or from other sources (e.g., third party servers). Second certificate revocation determiner 427 may access the message 468 (or other signed data) to determine what certificate was used to sign it (e.g., certificate #4). Second certificate revocation determiner 427 may then make a second OCSP response query 482 to the dynamic OCSP responder 405 or to the static OCSP responder 416 for the determined certificate (e.g., certificate #4).

The first OCSP response query 472 and/or the second OCSP response query 482 may include a nonce. The nonce may be randomly (or pseudo-randomly) generated by certificate revocation determiner 426 or 427 and inserted into the response query. The nonce may ensure that an OCSP response is freshly (dynamically) generated in response to the OCSP response query. This may reduce vulnerability to a man in the middle or replay attack.

In one embodiment, the first OCSP response query 472 and/or second OCSP response query 482 include an OCSP version number. A first OCSP version number may indicate that the relying party that generated the OCSP response query does not support multiple nonces (as is the case in the traditional OCSP response protocol). A second OCSP version number may indicate that the relying party device that generated the OCSP response query supports multiple nonces.

Proxy server 417 may be connected with dynamic OCSP responder 405, static OCSP responder 416 and the relying party devices 410, 412. Proxy server 417 may intercept some or all OCSP response queries directed to the static OCSP responder 416 and/or the dynamic OCSP responder 405. Proxy server 417 may be an intelligent proxy server that analyzes intercepted response queries to determine if they include a nonce. In one embodiment, those response queries that include a nonce are forwarded to the dynamic OCSP responder 405, and those OCSP response queries that do not include a nonce are forwarded to the static OCSP responder 416. For example, proxy server 417 may intercept the first OCSP response query 472 and the second OCSP response query 484 from the first relying party device 410 and second relying party device 412, respectively. If the first OCSP response query 472 includes a nonce, it may be forwarded to the static OCSP responder 416. If the second OCSP response query 482 does not include a nonce, it may be forwarded to the dynamic OCSP responder 405.

The dynamic OCSP responder 405 and/or static OCSP responder 416 may be servers that have been granted authority by the CA 403 to distribute certificate revocation information to relying parties 410, 412. Alternatively, the dynamic OCSP responder 405 and/or static OCSP responder 416 may be servers that relying party devices 410, 412 trust to accurately report on certificate revocation information, even though the servers have not been granted authority by the CA 403. In one embodiment, static OCSP responder 416 and dynamic OCSP responder 405 are each aspects of a service offered by a single OCSP response service provider. Alternatively, static OCSP responder 416 may be a third party server that is not managed by a manager of dynamic OCSP responder 405.

Static OCSP responder 416 may be an OCSP responder that stores pre-signed OCSP responses 425, and responds to OCSP response queries with the stored pre-signed OCSP responses 425. Pre-signed OCSP responses 425 are OCSP responses that are generated in advance of OCSP response queries. Pre-signed OCSP responses 425 may be generated on a periodic bases (e.g., once a day, twice a day, etc.). In one embodiment, static OCSP responder 416 generates pre-signed OCSP responses 415 itself. Alternatively, static OCSP responder 416 may receive the pre-signed OCSP responses 415 from an external source (e.g., from dynamic OCSP responder 405).

In one embodiment, the static OCSP responder 416 does not need to be authorized by the CA 403 to distribute certificate revocation status information to relying party devices 410 if the pre-signed OCSP responses 425 are digitally signed by an external source. Moreover, any transmittal of pre-signed OCSP responses 425 (e.g., from an external course to the static OCSP responder 416, or from the static OCSP responder 416 to a relying party) may not need to be secured since possible interception of pre-signed OCSP responses may be harmless. Thus, the static OCSP responder 416 may act as a simple distribution point for pre-signed OCSP responses 425.

Upon receiving a forwarded OCSP response query, static OCSP responder 416 may transmit a pre-signed OCSP response 425 that includes a certificate associated with the received OCSP response query. The pre-signed OCSP response 425 may be rapidly transmitted to the relying party device that generated the OCSP response query with little to no lag time.

Dynamic OCSP responder 405 may include an OCSP response generator 418, which may generate both pre-signed OCSP responses 425 and dynamic (fresh) OCSP responses 424. To generate pre-signed OCSP responses 425, OCSP response generator 418 may group certificates from the CRL 415 into multiple different groups, each of which may include multiple certificates. A pre-signed OCSP response 425 may then be generated 453 for each group and signed 454. The pre-signed OCSP responses 425 may then be deployed 463 to the static OCSP responder 416.

Upon the dynamic OCSP responder 405 receiving a forwarded OCSP response query, OCSP response generator 418 may determine the revocation statuses of certificates indicated by the OCSP response queries by checking CRL 415. A dynamic (fresh) OCSP response 424 may then be generated by the OCSP response generator 418. An OCSP response 424 includes revocation status information for each certificate that has an entry therein. Moreover, the OCSP response 424 may also include a nonce that was included in a received OCSP response query.

OCSP response generator 418 may group together multiple OCSP response queries, and generate a single OCSP response 424 that includes certificates associated with each of the OCSP response queries in the group. Nonces included in each received OCSP response query may be included in the single OCSP response 424. Accordingly, each relying party device 410, 412 that generated a nonce will trust the OCSP response 424.

In one embodiment, OCSP response generator 418 examines each received OCSP response to determine whether an originator (e.g., first relying party device 410 or second relying party device 412) of the OCSP response query supports multiple nonces. Such information may be determined by examining an OCSP version number that may be included in OCSP response queries. If an originator does not support multiple nonces, OCSP response generator 418 may not include OCSP response queries received from that originator in any groups. Instead, OCSP response generator 418 may generate a dedicated OCSP response that includes revocation status information for one or more certificates requested by the originator. Alternatively, the OCSP response query may be grouped with other OCSP response queries that do not include nonces. A resulting OCSP response would therefore include only a single nonce, and thus would be readable by the originator that sent the nonce.

In one embodiment, OCSP response generator 418 determines a current workload before forming any groups. If a workload is low, no groups may be generated, and each OCSP response query may be responded to with a dedicated OCSP response. If a workload is high, the OCSP response generator 418 may combine multiple OCSP response queries to form groups.

Once OCSP response 424 is generated, it is digitally signed 454 with a private key 420 that is part of a public key pair associated with the dynamic OCSP responder 405. The digital signature verifies the OCSP responder 405 as the OCSP response source, and ensures that the contents of the OCSP response 424 are accurate and can be trusted. Since each of the nonces included in the OCSP response queries are included in the OCSP response, the relying party devices 410, 412 will also trust that the OCSP response 424 is fresh.

In a first example, the proxy server 417 may receive first OCSP response query 472 that does not include a nonce from first relying party device 472. Proxy server 417 may forward the first OCSP response query 472 to the static OCSP responder 416. Static OCSP responder 416 may then send a first OCSP transmittal 462 that includes a pre-signed OCSP response 425 having therein an entry for a certificate associated with the first OCSP response query 472. First relying party device 472 may then verify whether or not the certificate inquired about has been revoked.

In a second example, proxy server 417 may receive a second OCSP response query 482 that includes a nonce from second relying party device 412. Proxy server 417 may forward the second OCSP response query 473 to dynamic OCSP response generator 405.

Dynamic OCSP responder 405 may receive the forwarded second OCSP response query 473 requesting a revocation status of, for example, certificate #1. OCSP response generator 418 may then wait a predetermined time period (e.g., half a second, one second, five seconds, one minute, etc.) before generating an OCSP response 424 for the first OCSP response query. OCSP response generator 418 may also wait for a predetermined number of response queries before generating the OCSP response 424. Additional OCSP response queries for revocation statuses of other certificates (e.g., certificate #3, certificate #4 and certificate #7) may be received within the predetermined time period and/or predetermined number of response queries, and included in a group as described with reference to FIG. 3.

Returning to FIG. 4, once the predetermined time period, predetermined number of response queries, or other criteria are met, OCSP response 424 may then be generated 453 by OCSP response generator 418. Exemplary OCSP response 424 includes the revocation status for certificates #1, #3, #4 and #7. Entries for certificates #1 and #7 from the certificate revocation list 415 are inserted 440 and 442, respectively, indicating that those certificates have been revoked. Certificates #3 and #4 are not included in the CRL, indicating that these certificates are still valid.

Dynamic OCSP responder 405 may reply to the second OCSP response query 482 with a second OCSP response transmittal 484, and to the additional OCSP response queries with additional OCSP response transmittals. Each of the OCSP response transmittals may include OCSP response 424. Second relying party device 412 may examine the OCSP response 424 to determine that certificate #1 has been revoked and to confirm that the nonce generated by certificate revocation determiner 427 is included, and may ignore the other certificates included in the OCSP response 424. Similarly, additional relying party devices (not shown) may examine the OCSP response 424 to determine whether certain certificates included in the OCSP response 424 are valid and whether appropriate nonces are include, and may ignore the other certificates included in the OCSP response 424.

Figure 5:
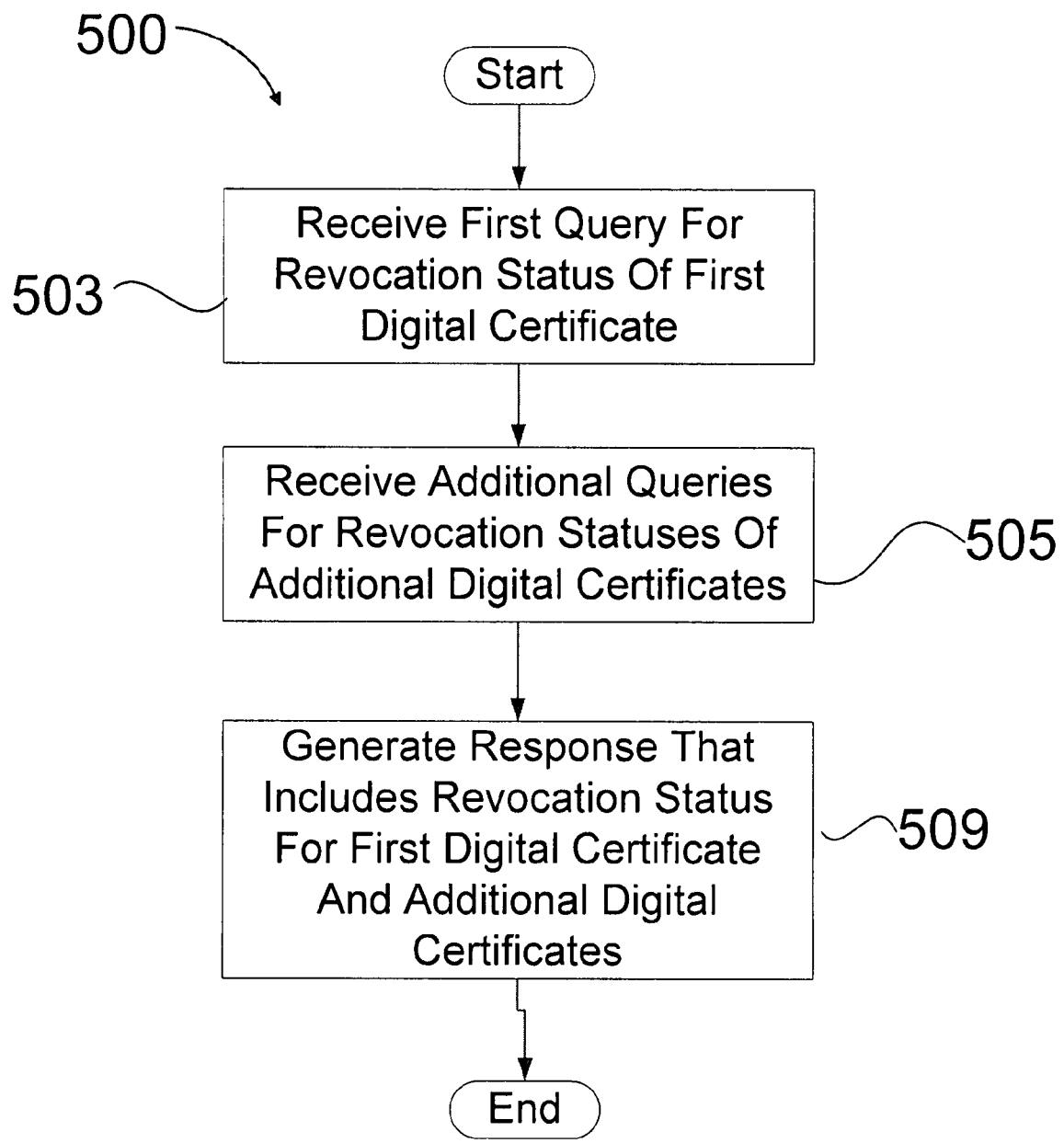
FIG. 5 illustrates a flow diagram of one embodiment for a method of propagating certificate revocation information.

FIG. 5 illustrates one embodiment for a method 500 of propagating certificate revocation information. The method may be performed by processing logic that may comprise hardware (e.g., circuitry, dedicated logic, programmable logic, microcode, etc.), software (such as instructions run on a processing device), or a combination thereof. In one embodiment, method 500 is performed by OCSP responder 305 of FIG. 3 and/or dynamic OCSP responder 405 of FIG. 4. Alternatively, method 500 may be performed by a SCVP server, a CMP server or an XKMS server.

Referring to FIG. 5, method 500 begins with block 503, in which a first query for a first revocation status of a first digital certificate is received. The first query may be an OCSP response query. Alternatively, the first query may be an SCVP response query, a CMP response query or an XKMS response query.

At block 505, one or more additional queries for revocation statuses of additional digital certificates are received. The additional queries may be OCSP response queries, SCVP response queries, CMP response queries, etc.

At block 509, a response is generated that includes revocation statuses for the first digital certificate and for the additional digital certificates. In one embodiment, for the additional digital certificates to be included in the response, the additional queries are received within a predetermined time period of the first query. In another embodiment, for the additional digital certificates to be included in the response, the additional queries are received before a predetermined response query limit is reached. The predetermined response query limit may limit the number of queries that may be responded to in a single response. In yet another embodiment, the additional digital certificates are included in the group if they are received within the predetermined time period and within the predetermined response query limit. Alternatively, the additional digital certificates may be included in the response if other criteria are satisfied.

Figure 6:
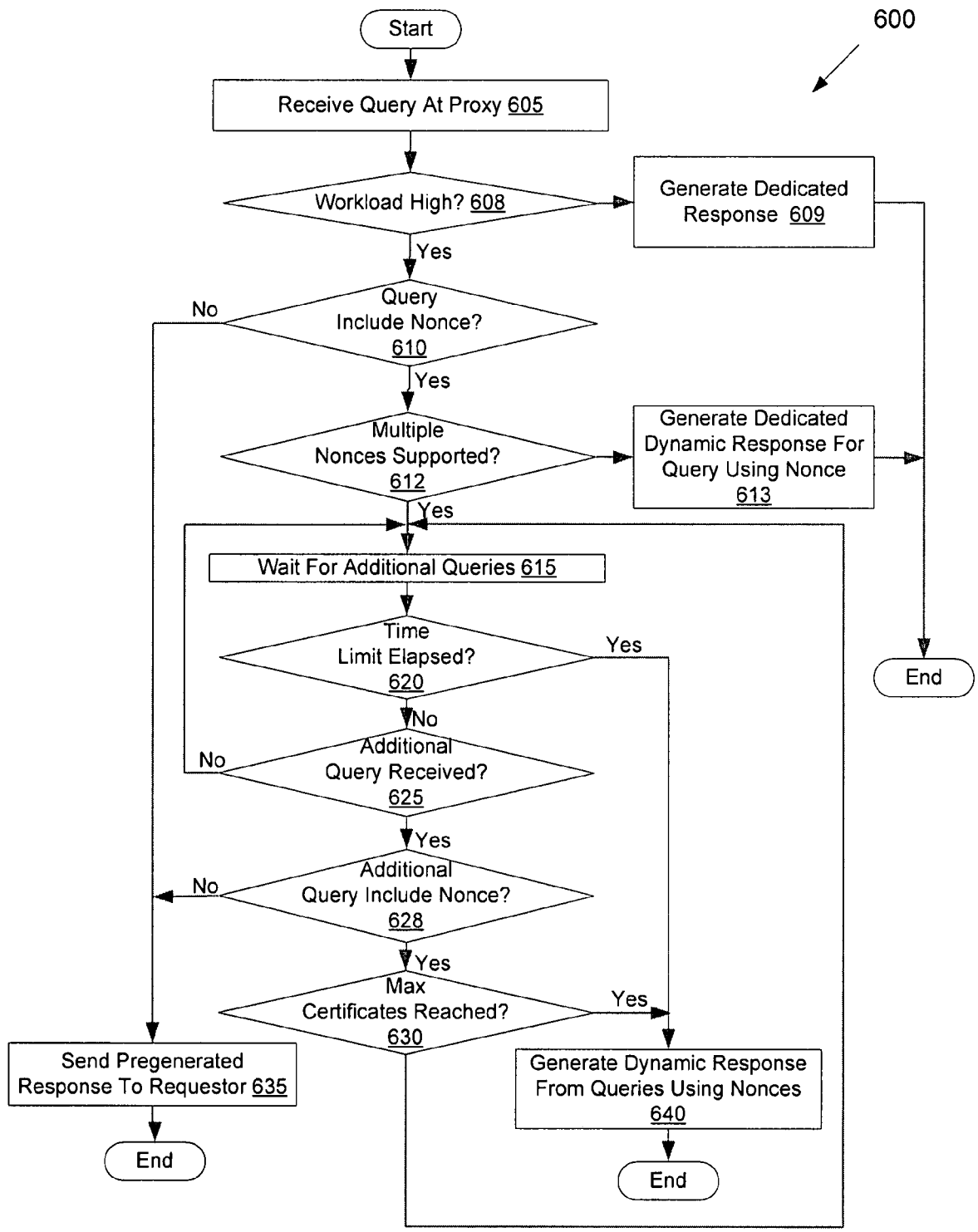
FIG. 6 illustrates a flow diagram of another embodiment for a method of propagating certificate revocation information.

FIG. 6 illustrates another embodiment for a method 600 of propagating certificate revocation information. The method may be performed by processing logic that may comprise hardware (e.g., circuitry, dedicated logic, programmable logic, microcode, etc.), software (such as instructions run on a processing device), or a combination thereof. In one embodiment, method 600 is performed by OCSP responder 305 of FIG. 3 and/or dynamic OCSP responder 405 of FIG. 4.

Alternatively, method 600 may be performed by a SCVP server, a CMP server or an XKMS server.

Referring to FIG. 6, method 600 begins with block 605, in which a first query for a first revocation status of a first digital certificate is received at a proxy. The first query may be an OCSP response query, and may or may not include an OCSP version number that identifies whether multiple nonces are supported by an originator of the OCSP response query. Alternatively, the first query may be an SCVP response query, a CMP response query or an XKMS response query.

At block 608, processing logic determines a current workload. If a current workload is low, the method proceeds to block 609 and a dedicated response is generated for the query. If a current workload is high, the method continues to block 610.

At block 610, processing logic determines whether the query includes a nonce. The nonce may guarantee that a response generated to answer the query is a fresh response. If no nonce is included in the query, the method proceeds to block 635. If a nonce is included in the query, the method proceeds to block 612.

At block 612, processing logic determines whether an originator of the response query supports multiple nonces. This may be determined by examining a version number (e.g., OCSP version number) included in the response query. If the originator supports multiple nonces, the method proceeds to block 615. If the originator does not support multiple nonces, the method proceeds to block 613. At block 613, a dedicated dynamic response is generated for the query using the nonce.

At block 615, processing logic waits for additional queries. At block 620, processing logic determines whether a predetermined time limit (e.g., half a second, one second, five seconds, etc.) has elapsed. The time limit may be a predetermined time period that may provide a compromise between a desire to combine multiple queries into a single group that may be used to generate a response, and a desire to provide responses to queries as quickly as possible. Therefore, additional response queries received within the predetermined time period may be combined with those response queries already received. A single response may then be prepared that addresses digital certificates inquired about in each of the response queries. If the time limit has elapsed, the method proceeds to block 640. If the time limit has not elapsed, the method proceeds to block 625.

At block 625, processing logic determines whether any additional queries have been received. Additional queries may request revocation status of one or more additional digital certificates, and may include one or more additional nonces. If one or more additional queries for revocation statuses of additional digital certificates are received, the method proceeds to block 628. If no additional queries are received, the method proceeds to block 615.

At block 628, processing logic determines whether the additional query includes a nonce. If the additional query does not include a nonce, the method proceeds to block 635 for the additional query. If the additional query does include a nonce, the method continues to block 630. Moreover, even if the additional query does not include a nonce, the method still proceeds to block 630 for those received queries that do include nonces.

At block 630, processing logic determines whether a maximum number of certificates has been reached. The maximum number of certificates may be 5 certificates, 10 certificates, 50 certificates, etc. Alternatively, processing logic may determine whether a maximum number of queries has been reached. The maximum number of certificates (or queries) may ensure that responses have a maximum size limit. Therefore, even if 2000 queries are received within the time limit, the max certificates value may limit the number of queries that will be included in a single response. If the maximum number of certificates (or queries) has not been reached, the method proceeds to block 615. If the maximum number of certificates (or queries) has been received, the method proceeds to block 640.

At block 635, a pre-generated (pre-signed) response is sent to a requester who sent the query that did not include a nonce. The method then ends in relation to that query.

At block 640, a dynamic (fresh) response is generated. The dynamic response is generated using a group of queries that includes each of the queries received within the time limit and within the max number of certificates. Therefore, certificates associated with each of the queries in the group are included in the response. Moreover, the response may also include the nonces that were included in each of the queries in the group. Thus, each query requestor may trust that the response is a fresh response. The method then ends.

Figure 7:
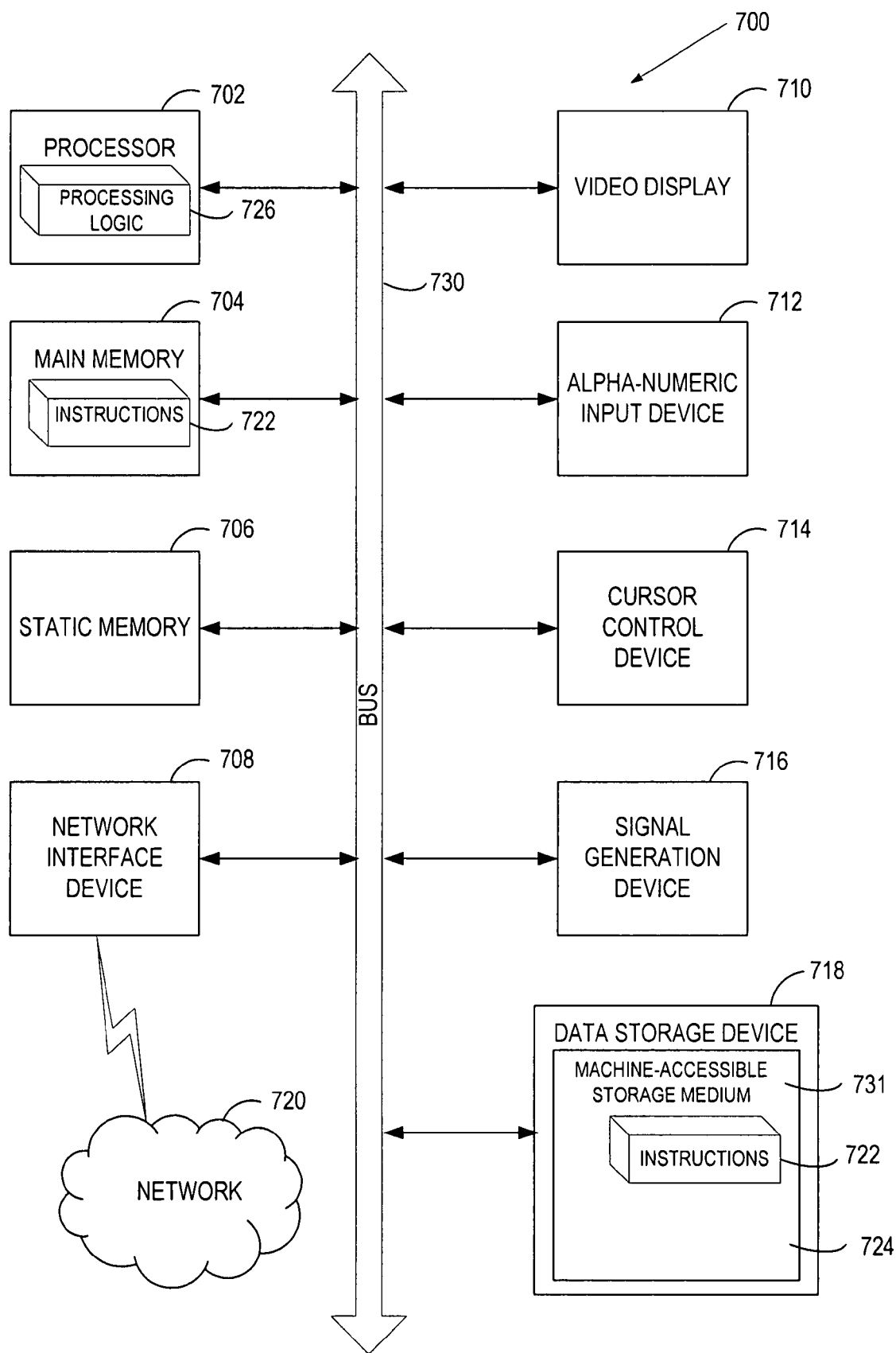
FIG. 7 illustrates a diagrammatic representation of a machine in the exemplary form of a computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device 702 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 731 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-accessible storage media. The instructions 722 may further be transmitted or received over a network 720 via the network interface device 708.

While the machine-accessible storage medium 731 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for propagating certificate revocation information has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
    receiving, by a processing device, a first query regarding a revocation status of a first digital certificate from a first client computing device;
    receiving, by the processing device, one or more additional queries regarding revocation statuses of one or more additional digital certificates from a second client computing device;
    determining, by the processing device, whether one or more response generation criteria have been satisfied;
    responsive to determining that at least one of the one or more response generation criteria are satisfied, and after receiving the first query and the one or more additional queries, generating a single response message that comprises a response to the first query and responses to the one or more additional queries, the response message comprising the revocation status of the first digital certificate and the revocation statuses of the one or more additional digital certificates;
    sending the response message to the first client computing device; and
    sending the response message to the second client computing device.

2. The method of claim 1, wherein:
    the first query comprises a first nonce;
    at least one of the one or more additional queries comprise one or more additional nonces; and
    the response message comprises the first nonce and the one or more additional nonces.

3. The method of claim 1, wherein the response message is dynamically generated upon a client request if at least one of the first query and the one or more additional queries comprise a nonce.

4. The method of claim 1, wherein the response message is one of an online certificate status protocol (OCSP) response message or a simple certificate validation protocol (SCVP) response message.

5. The method of claim 1, wherein the one or more response generation criteria comprise a digital certificate count criterion, the method further comprising:
    counting a number of digital certificates for which queries have been received; and
    determining that the digital certificate count criterion has been satisfied when queries have been received for a threshold number of digital certificates.

6. The method of claim 1, wherein the one or more response generation criteria comprise a timeout criterion, the method further comprising:
    determining that the timeout criterion has been satisfied when a predetermined amount of time has elapsed since the first query was received.

7. A non-transitory machine-accessible medium including instructions that, when executed by a processing device, cause the processing device to perform operations comprising:
    receiving, by the processing device, a first query regarding a revocation status of a first digital certificate from a first client computing device;
    receiving, by the processing device, one or more additional queries regarding revocation statuses of one or more additional digital certificates from a second client computing device;
    determining, by the processing device, whether one or more response generation criteria have been satisfied;
    responsive to determining that at least one of the one or more response generation criteria are satisfied, and after receiving the first query and the one or more additional queries, generating a single response message that comprises a response to the first query and responses to the one or more additional queries, the response message comprising the revocation status of the first digital certificate and the revocation statuses of the one or more additional digital certificates;
    sending the response message to the first client computing device; and
    sending the response message to the second client computing device.

8. The non-transitory machine-accessible medium of claim 7, wherein:
    the first query comprises a first nonce;
    at least one of the one or more additional queries comprise one or more additional nonces; and
    the response message comprises the first nonce and the one or more additional nonces.

9. The non-transitory machine-accessible medium of claim 7, wherein the response message is dynamically generated upon a client request if at least one of the first query and the one or more additional queries comprise a nonce.

10. The non-transitory machine-accessible medium of claim 7, wherein the response message is one of an online certificate status protocol (OCSP) response message or a simple certificate validation protocol (SCVP) response message.

11. The non-transitory machine-accessible medium of claim 7, wherein the one or more response generation criteria comprise a digital certificate count criterion, the operations further comprising:
    counting a number of digital certificates for which queries have been received; and
    determining that the digital certificate count criterion has been satisfied when queries have been received for a threshold number of digital certificates.

12. The non-transitory machine-accessible medium of claim 7, wherein the one or more response generation criteria comprise a timeout criterion, the operations further comprising:

determining that the digital certificate count criterion has been satisfied when queries have been received for a threshold number of digital certificates.

13. A system comprising:

a database to store revocation statuses of digital certificates; and a first server computing device, coupled with the database, to perform the following:

receive a first query regarding a revocation status of a first digital certificate from a first client computing device, receive one or more additional queries regarding revocation statuses of one or more additional digital certificates from a second client computing device, determine whether one or more response generation criteria are satisfied, generate a single response message that comprises a response to the first query and responses to the one or more additional queries using corresponding revocation statuses stored in the database, the response message comprising the revocation status of the first digital certificate and the revocation statuses of the one or more additional digital certificates, wherein the single response message is generated after receiving the first query and the one or more additional queries in response to determining that at least one of the one or more response generation criteria are satisfied, send the response message to the first client computing device, and send the response message to the second client computing device.

14. The system of claim 13, further comprising:

a proxy server coupled with the first server to receive the first query and the one or more additional queries, and to forward each of the first query and the one or more additional queries that comprises a nonce to the first server; and the first server configured to dynamically generate the response message upon receiving at least one of the first query and the one or more additional queries, the response message including the revocation status of digital certificates included in forwarded queries and the nonces included in the forwarded queries.

15. The system of claim 13, wherein the response message is one of an online certificate status protocol (OCSP) response message and a simple certificate validation protocol (SCVP) response message.

16. The system of claim 13, wherein the one or more response generation criteria comprise a digital certificate count criterion, further comprising the first server to:

count a number of digital certificates for which queries have been received; and determine that the digital certificate count criterion has been satisfied when queries have been received for a threshold number of digital certificates.

17. The system of claim 13, wherein the one or more response generation criteria comprise a timeout criterion, further comprising the first server to:

determining that the digital certificate count criterion has been satisfied when queries have been received for a threshold number of digital certificates.

18. The method of claim 1, wherein the one or more response generation criteria comprise at least one of a digital certificate count criterion or a timeout criterion.

19. The method of claim 1, further comprising:

signing the response message.

* * * * *